Figure 1:
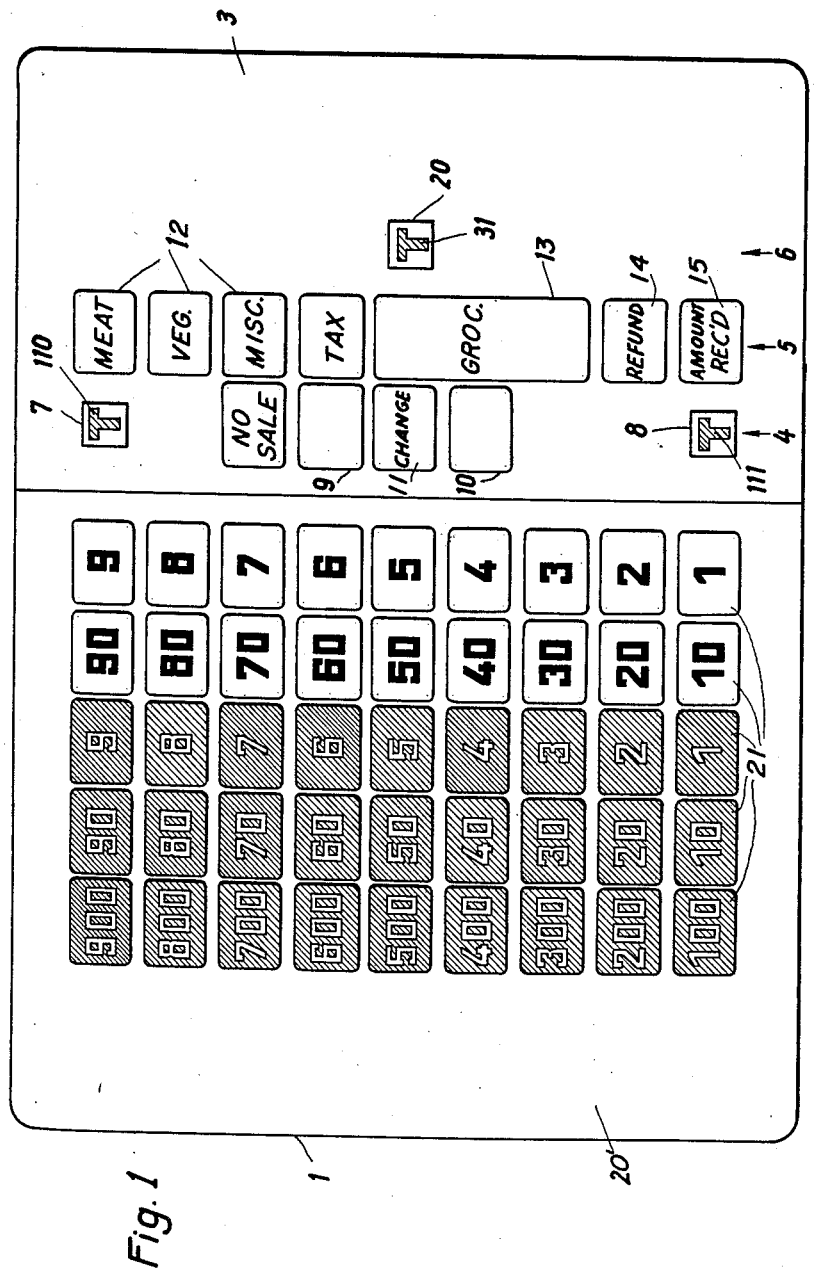

Feb. 5, 1963                    G. BECKER                      3,076,595
            SELECTIVE CONTROL DEVICE FOR KEYBOARD-TYPE BUSINESS MACHINES
Filed Nov. 7, 1960                                         8 Sheets-Sheet 1

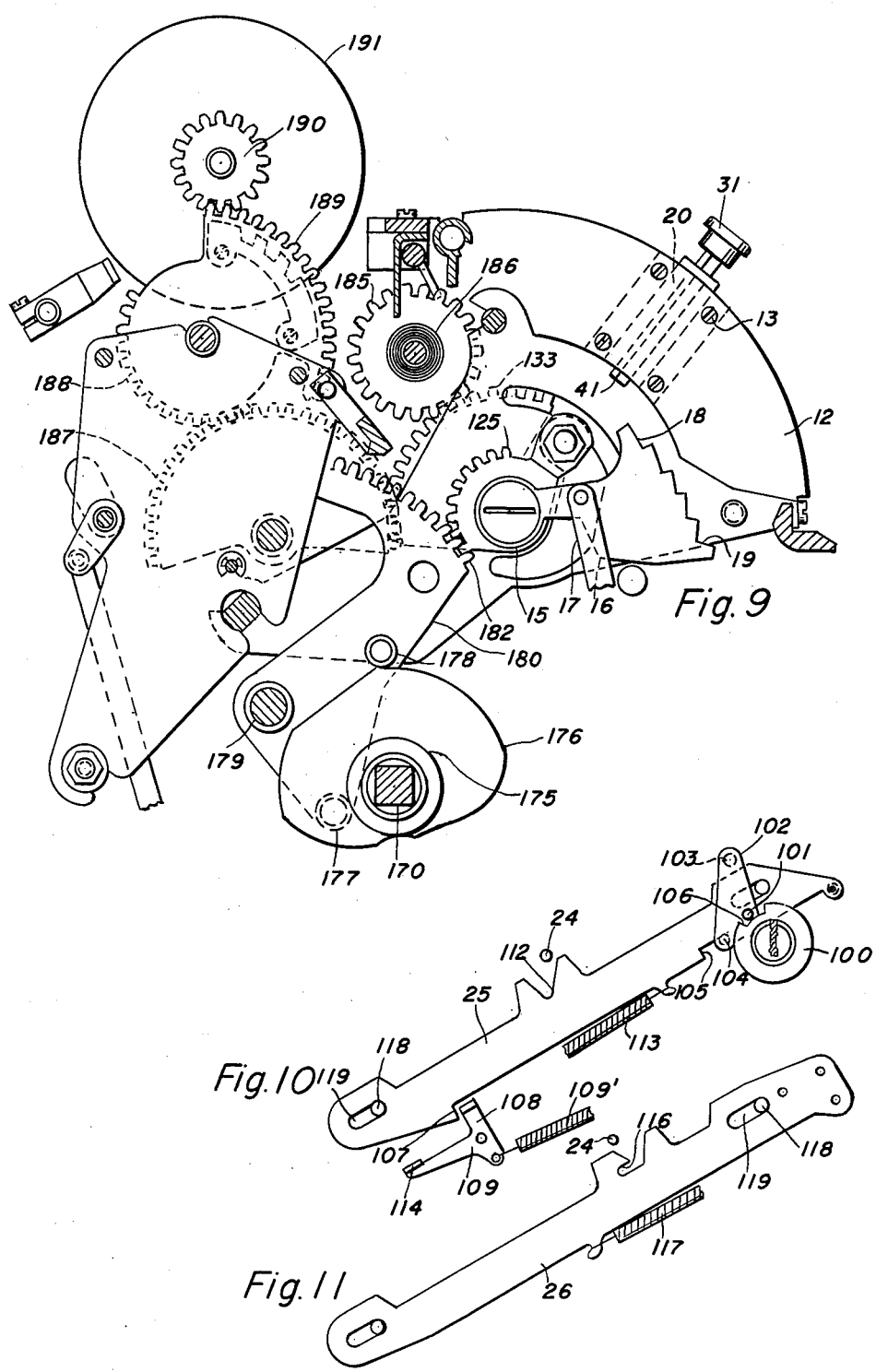

United States Patent Office 3,076,595
Patented Feb. 5, 1963

3,076,595
SELECTIVE CONTROL DEVICE FOR KEYBOARD-TYPE BUSINESS MACHINES
Gerhard Becker, Bielefeld, Germany, assignor to Anker-Werke Aktiengesellschaft, Bielefeld, Germany, a corporation of Germany
Filed Nov. 7, 1960, Ser. No. 67,438
Claims priority, application Germany Nov. 9, 1959
8 Claims. (Cl. 235—27)

My invention relates to cash registers, computers, accounting machines and other business machines of the keyboard type. The keyboard of such machines comprises a multi-digit group of amount-posting keys, and a group of "special keys" which are to be actuated for selecting certain adding mechanisms and for selecting a desired mode of operation such as multiple-item registering or totalizing or subtotalizing, for example. More specifically, my invention concerns itself with the "special keys" and relates to a control device for posting a selection of adding mechanisms or modes of operation into the machine and transferring the posted selection to the machine mechanisms to be adjusted or actuated for registering, printing, totalizing and the like functions.

The known selector and control devices of this type receive the posted selections from push-button keys of the keyboard or, in some cases, also from latch keys removable from the keyboard and insertable into the keyholes of corresponding locks. The total number of these special keys corresponds to the total of selective adding mechanisms and modes of operation available in the machine. The selection posted into the keyboard assembly by means of such a special key is entered into the operating components by the action of transfer mechanisms also called differential mechanisms. As a rule, one such differential mechanism is provided for each blank of keys and comprises a feeler member or slider, normally in zero position, which during an operating run of the machine is progressively displaced by a single-revolution drive but is stopped in a selected position determined by the particular special key actuated at a time, whereas the machine drive continues completing its revolution while stressing a spring which couples the drive with the feeler member. In this manner, the previously constrained coupling between the drive and the feeler member of the transfer mechanism is interrupted as soon as the feeler member abuts against the depressed key correlated to the particular adding mechanism or mode-controlled mechanism to be activated.

Also known is a selector device which serves for the selective setting of printing-type wheels in accordance with a particular one of a number of latch keys that can be inserted into a lock member of the keyboard assembly. The shanks of the keys carry lugs that are differently arranged at the respective keys. These lugs act upon sliders and thus control a number of racks meshing with spur gears that are connected with the printing-type wheels to be selectively adjusted.

The modern trend in the development of the keyboard-type business machines, particularly cash registers and machines for accounting purposes, is toward an increasing number of special keys. In the known machines, this requires a correspondingly greater amount of space on the keyboard as well as more space for the coordinated differential mechanisms, thus tending to increase the overall dimensions of the machine.

It is an object of my invention, therefore, to afford providing the business machine with an increased number of special keys without necessitating an increase in space for the keyboard and other subassemblies of the machine.

To this end, and in accordance with a feature of my invention, I provide the keyboard assembly of the business machine with a key unit which essentially constitutes a safety lock whose inner keyhole portion (nut) is axially slidable in the outer portion (barrel) and is normally biased by a spring to a top limit position in which the nut portion is locked in the barrel portion. I further provide this lock unit with a group of removable latch keys, all mating the keyhole but having respectively different shank portions. The keyhole portion of the lock is thus unlockable and axially displaceable when one of the mating keys is inserted and is pushed into the lock, in which position the above-mentioned shank portion of the key protrudes inwardly into the path of the displaceable feeler member of the differential mechanism. As a result, the feeler member, when advanced during the next machine run, is stopped by the shank portion of the key in a selected position of displacement that corresponds to the particular one key used at a time. For the purpose of such selective positioning of the feeler member, the shank portions of the respective keys of the group are all different and the feeler member has steps or other abutments that enter into engagement with the protruding shank of the inserted and pushed-in key only when the feeler member has reached the one position determined by that particular key.

As a result, the above-mentioned number of keys, all insertable into one and the same keyboard unit, afford the desired differentiation in positioning or timing performance of the differential mechanism.

Figure 2:
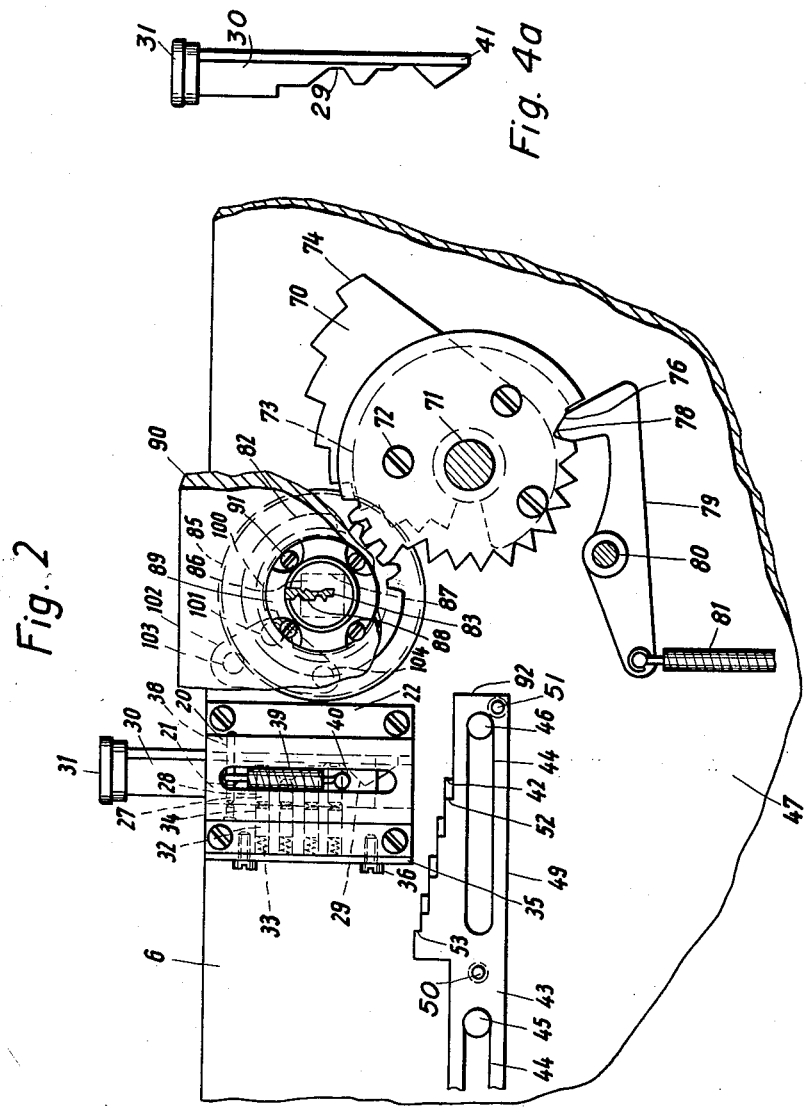
Figure 3:
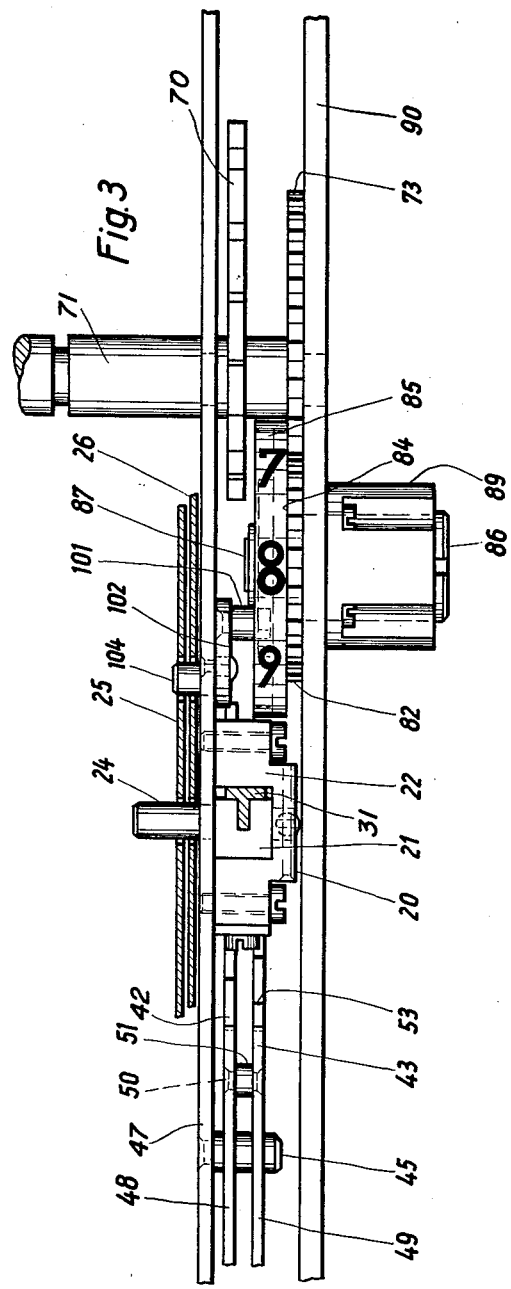
Figure 4:
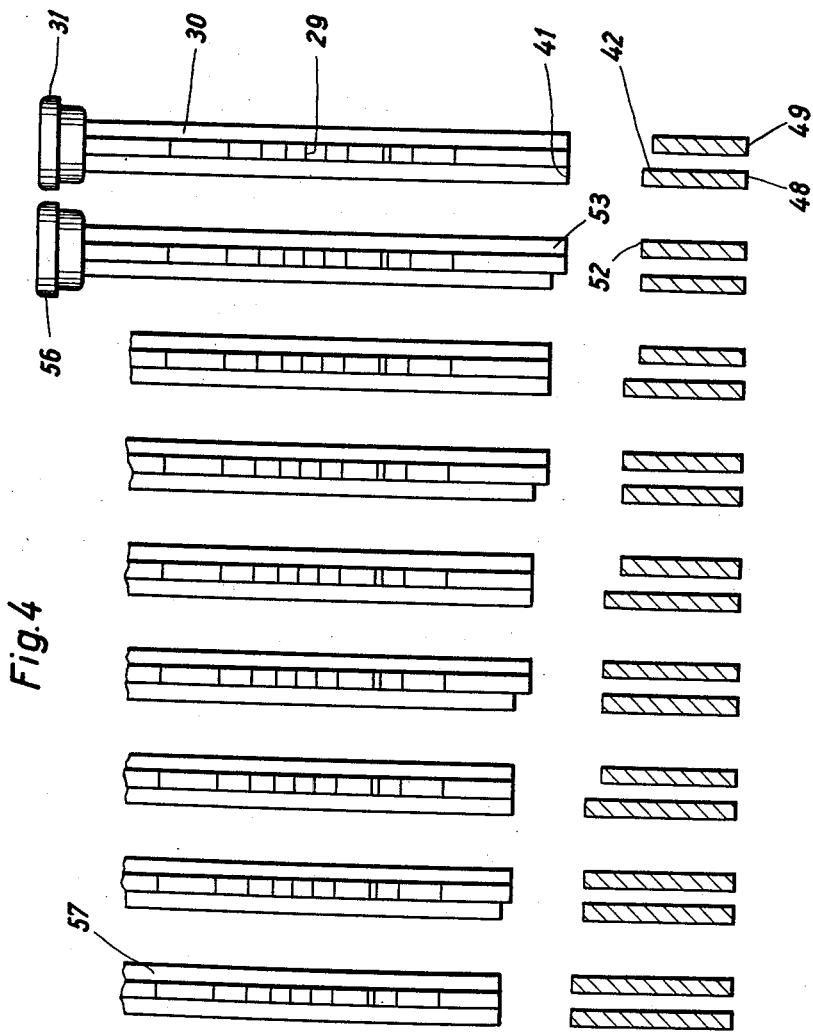
Figure 5:
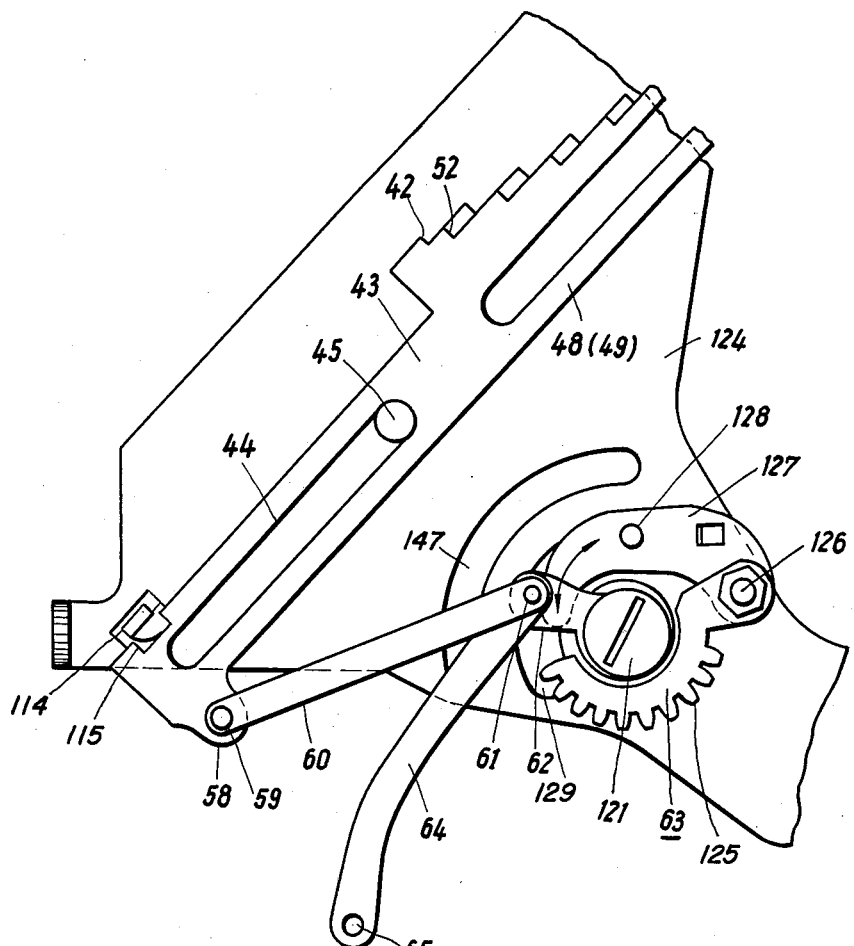
Figures 6, 7:
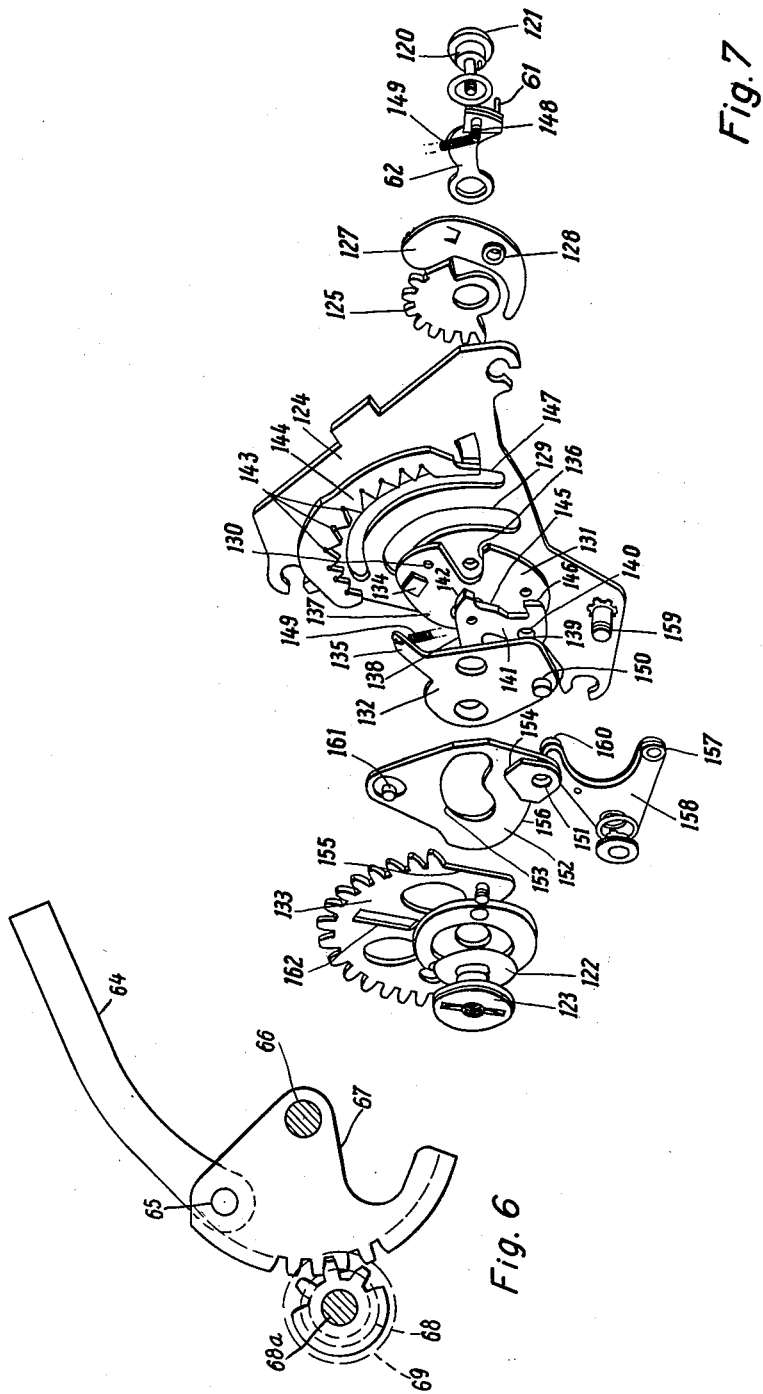
Figure 8:
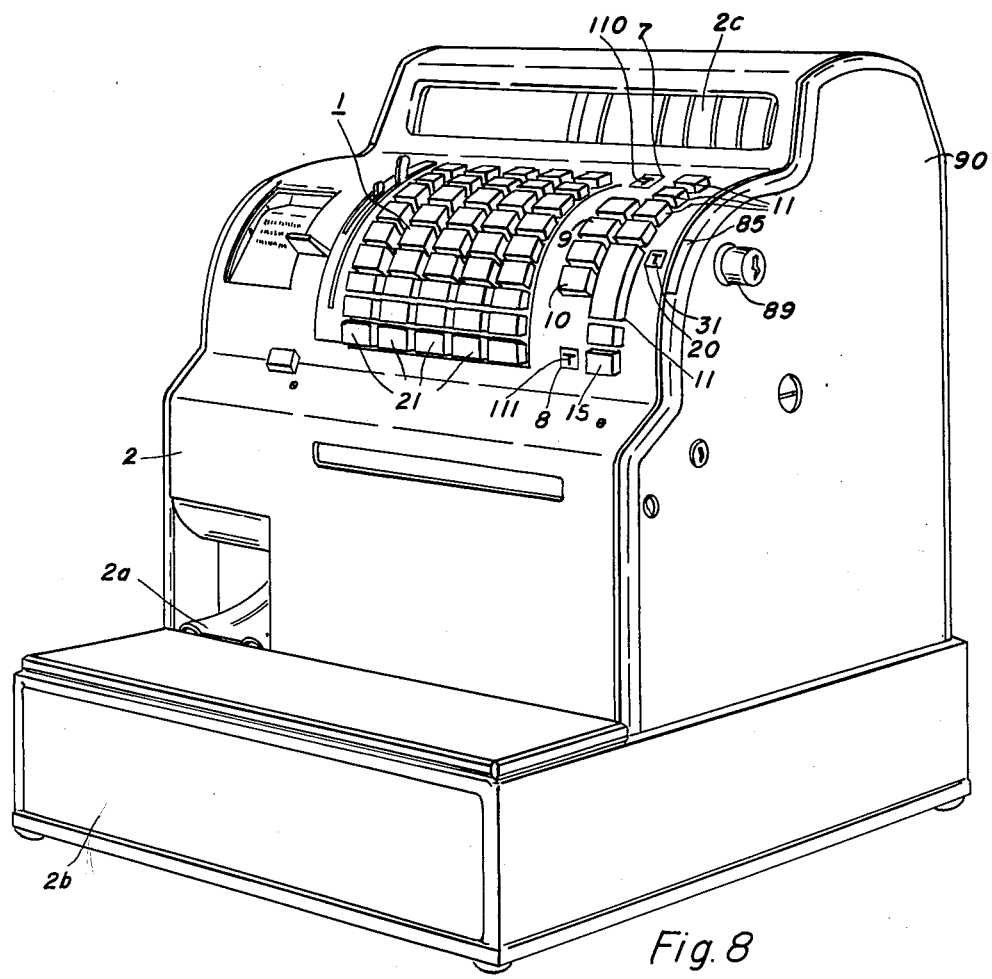

The above-mentioned and further objects and features of my invention, said features being set forth with particularity in the claims annexed hereto, will be described in the following with reference to the embodiments of cash registers according to the invention illustrated by way of example on the accompanying drawings, in which:

FIG. 1 is a top view of the keyboard;
FIG. 2 is a lateral view of the control device shown removed from the machine; and FIG. 3 is a top view of the same device.
FIG. 4 shows details of the different keys insertable into a single key unit, and also shows in cross section a feeler assembly cooperating with the respective keys; and FIG. 4a is a side view of one of the keys shown in FIG. 4.
FIG. 5 is a lateral view of part of the control device shown in FIG. 3; and FIG. 6 is another lateral view showing the connection of the control device with an adding-mechanism selector shaft;
FIG. 7 is an exploded and perspective view of the differential mechanism;
FIG. 8 is a perspective view of an entire cash register equipped with the control device according to FIGS. 2 to 7, but somewhat modified for accommodating an arcuate instead of a planar keyboard.
FIG. 9 is a lateral view of the mechanisms for driving the printing and indicating devices of the cash register with arcuate keyboard.
FIG. 10 shows separately a zero-pawl slider and FIG. 11 a latch pawl slider which forms part of the differential mechanism according to FIGS. 2 and 3 (planar keyboard).

The illustrated cash register (FIG. 8) is of a type commonly employed in stores. It is equipped with a keyboard 1, counting and calculating mechanisms, a mechanism for printing sales checks and issuing them through an opening 2a, a cash drawer 2b which opens automatically upon completion of a machine run or depression of a "No Sale" key. Also provided is an indicator 2c on which the posted and registered amounts are visible. The working parts of the cash register, enclosed in a housing 2 having a cover and a lateral wall 90, are actuated under control by the particular keys depressed by the cashier or salesman in accordance with the business transaction to be registered. The keyboard 1 comprises an amount-posting portion 20' (FIG. 1) with a decimal group of amount keys 21 arranged in a plurality of vertical key banks for the respective digits. The keyboard 1 further comprises a set 3 of "special keys" arranged in three vertical banks 4, 5 and 6. The keys in bank 4 are mode-of-operation selector keys and include a lock-type posting unit 7 and a similar posting unit 8 designed in accordance with the present invention and more fully described below. The operation-selector bank 4 further comprises a motor key 9 (total key) for releasing a machine run to furnish a total of amounts previously posted in the amount keyboard 20'. Another motor key 10 (subtotal key), when depressed, releases a subtotalizing machine run, and another key 11 in bank 4 causes the amount of change, due to a customer, to be indicated or printed.

The several keys of the adding-mechanism selector bank 5 control the entry of individual posted amounts into selected special totalizers for classes of goods or services sold. In the illustrated cash register, there are special totalizers for sales of meat, vegetables, and groceries which are selected by means of respective selector keys 12 and 13. Refunds are separately totalized when a key 14 is depressed, and the amount of cash handed over by a customer is entered and registered when the key 15 is actuated after the cash amount is posted by depressing the proper keys 21 of the amount keyboard 20'.

Since the general operation and design of the cash register are known, the component mechanisms for calculating and recording totals and subtotals, for subtracting the total of a bill from the amount of cash received to arrive at the amount of change to be returned, as well as the check-printing and other accessory devices are not illustrated and further described, with the exception of one of the adding-mechanism selector devices which is illustrated and will be described in conjunction with the key-actuated control device according to the invention.

The remaining bank 6 of the keyboard is provided with a single key unit 20 which, with respect to design and performance, corresponds to the units 7 and 8 of bank 4 and will be more fully described presently.

The lockable key unit 20 (FIGS. 1, 2, 3) is essentially a safety lock and has an inner keyhole portion or "lock nut" 21 of prismatic shape and substantially square cross section which is axially displaceable in the fixed outer portion or barrel structure 22 of the lock. The keyhole portion or nut 21 carries a lateral pin 24 (FIGS. 3, 10, 11). When the nut is being depressed by means of an inserted lock key, the pin 24 engages a zero-pawl slider 25 and a latching slider 26 thus displacing these sliders in a direction transverse to the travel direction of the pin 24. The lock nut 21 carries tumbler pins 27 (FIG. 2) which are slidable in respective bores 28 of the nut and cooperate with the shoulder of respective notches 29 in the shank portion 30 of an inserted key 31 (FIGS. 2, 4, 4a). The tumbler pins 27 register with respective counter pins 32 which are biased by springs 33 and are guided in respective bores 34 of the fixed outer or barrel portion 20 of the lock. The bores 34 are covered toward the outside by a cover sheet 35 which is fastened by screws 35 to the housing 22 of the lock.

When a proper key 31 is inserted into the lock according to FIG. 2, the counter pins 32, previously protruding into the respective bores 28, are pushed by pins 27 out of the bores 28, so that the lock nut 21, when the key 31 is being pushed in, moves downwardly until the transverse pin 24 has displaced the latching slider 26 (FIGS. 3, 11) and has become latched thereby. The displacement of the slider 26 releases a machine run as in the conventional cash registers. A fixed transverse pin 38 (FIG. 2) is engaged by one end of a spring 39 whose other end is fastened to a pin 40 of the displaceable lock nut 21. The spring is tensioned when the key and the lock nut are being pushed in as described above. During the next following releasing or clearing operation, the spring 39 returns the lock nut 21 and the key 31 to the starting position shown in FIG. 2.

Each key 31 (FIGS. 4, 4a) has a shank portion which, when the key is inserted into the lock nut, protrudes downwardly (FIG. 2) beyond the nut and forms a lateral shoulder or abutment 41 engageable with a step 42 of a feeler member 43 composed of two parts 48 and 49 whose respective upper contours have a stepped shape (FIGS. 2, 3, 5). The feeler structure 43 has longitudinal slots 44 by means of which it is guided on pins 45, 46 fastened to a side wall 47 of the frame structure. The stepped parts 48 and 49 are rigidly joined with each other by rivets 50 and spacer sleeves 51 (FIG. 3). The path of feeler motion is at a right angle to the inward pushing motion of the key 31 and lock nut so that, when the key 31 is pushed in, its shoulder 41 enters into the travel path of the step 42 on the feeler member. As a result, during advancing motion of the feeler member toward the right relative to FIG. 2, such motion is stopped when the step 42 abuts against the shoulder 41 of the depressed key, thus arresting the feeler member in a given position determined by the location of the stop shoulder 41 on the particular key 31 being used. Laterally adjacent to the steps 42 of feeler part 48, are steps 52 of the part 49. The steps 52 cooperate with respective second stop shoulders 53 of the other lock keys such as those denoted by 56 and 57 in FIG. 4, where a number of other keys are illustrated. Any one of these keys can be inserted into the lock unit 20 for downward displacement of the lock nut in the above-described manner. However, the protruding shank portions of the different keys have respectively different lengths. For example, the shank 30 of key 31 according to FIG. 4 is longer than the shank portion of key 57, and the stop shoulders 41 and 53 are differently arranged for cooperation with the respective paths 48 and 49 of the feeler member. As a result, the feeler member, during the above-mentioned travel from the zero position toward the right (FIG. 2) can be stopped in any one of a relatively large number of selected positions, depending upon which particular key of the mating group is used at a time.

The feeler member 43 (FIG. 5) has an eye lug 58 provided with a pivot pin 59 by means of which a link 60 is joined with the slider assembly of the feeler member. The link 60 engages at its other end a crank pin 61 on a crank arm 62 of a transfer (differential) mechanism 63 whose particular design will be more fully described below with principal reference to FIG. 7. Also linked to the crank pin 61 of arm 62 is a linking rod 64 whose other end is pivotally joined at 65 with a spur-gear segment 67 (FIG. 6) rotatably mounted on a fixed pin 66. The segment 67 meshes with a pinion 68 on the control shaft 68a for the selection of adding mechanisms schematically indicated at 69. That is, the rotational displacement of the segment 67 by a given angular amount causes a corresponding amount of rotation to be imposed upon the selector shaft 68a, thus placing a correspondingly selected adding mechanism into operation in accordance with the selection in conventional cash registers of this general type. It will be understood from the foregoing that such selection, depending upon the amount of displacement imparted through link 64 and segment 67 to the selector shaft 68a, depends upon the amount of linear displacement to which the slider assembly 43 is subjected, and hence is primarily dependent upon the particular key 31, 56 or 57 which is being used at a time and which controls the particular position in which the sliding motion of the feeler member is stopped.

Aside from the above-described control of the feeler member 43 by means of the insertable push keys, the cash register is equipped with master control means likewise acting upon the slider 43. These control means comprise a disc 70 (FIGS. 2, 3) rotatably mounted on a shaft 71 fastened to the side wall 47 of the machine frame structure. The disc 70 is rigidly joined with a gear segment 73 by bolts 72 (FIG. 2). The control disc 70 is provided with peripherally adjacent steps of respectively different radial spacing from the shaft 71, one of these steps being denoted by 74. The spur-gear segment 73 carries coaxial ratchet teeth 76 engageable by a catch nose 78 of a retaining lever 79 which is rotatably mounted on a fixed pivot pin 80 and is biased into meshing engagement with the ratchet teeth by a spring 81.

The gear segment 73 meshes with a spur gear 82 which is coaxially joined with an indicator disc 85 (FIGS. 2, 3) carrying the numbers "1" to "9," of which one is visible at a time from the top side of the keyboard assembly. The gear 82 is further connected by a shaft 87 with a lock nut 86 whose keyhole 88 is accessible from the side of the machine housing for insertion of a lock key 83 (shown in cross section in FIG. 2). The lock nut 86 is of the cylindrical type as customary for ordinary safety locks and is provided with tumbler pins substantially as described above with reference to the key unit 20, so that upon insertion of a mating key, the nut becomes unlocked and can be turned in the barrel portion 89 (FIGS. 2, 3, 8) which is fastened by screws 91 to the side wall 90 of the machine. When the lock nut 86 is thus being turned, the spur gear 82 connected therewith imparts rotation to the gear segment 73 which accordingly adjusts the control disc 70 to a desired position. The adjusted position is accurately determined by the retaining member 72 and the ratchet teeth 76 and can be read off at the indicator disc 85 whose numbers "1" to "9" are visible from the operating side of the cash register. When the front edge 92 (FIG. 2) of the feeler member 43, during its sliding motion toward the right, hits against one of the stops formed by the stepped contour of the control disc 70, for example the step 74, the further motion of the feeler member is stopped, thereby also stopping the crank arm 62 of the differential mechanism 63 in the correspondingly selected position.

The design and operation of the differential mechanism 63 (FIG. 5) will now be described in detail. The crank arm 62, whose crank pin 61 is linked by rod 64 (FIG. 5) to the segment 67 for selecting an adding unit 69 is journalled on a shaft or neck portion 120 (FIG. 7) of a screw bolt 121 (FIGS. 5, 7). The bolt 121 is fastened to a lateral wall 124 of the key bank 6 by means of a nut 123 which has a guiding portion 122 (FIG. 7, extreme left). Mounted beside the arm 62 on the shaft portion 120 of journalling bolt 121 is the gear segment 125 which meshes with a driving gear in order to impart a given amount of angular motion to the crank arm 62 of the differential mechanism during each individual machine run. The gear segment 125 is firmly joined by a screw 126 with a finger-shaped arm 127 (FIG. 7). Fastened to the arm 127 is a pin 128 (FIGS. 5, 7) which passes through an arcuate opening 129 of side wall 124 (FIGS. 5, 7) into the bore 130 (FIG. 7) of a control cam 131. The cam 131 is rotatably mounted on the journalling bolt 121 together with a control member 132 and a gear segment 133 in coaxially rotatable relation.

The control cam 131 carries a rectangular stop lug 134 which cooperates with a finger-shaped lug 135 of the control member 132. The cam contour of cam 131 has a V-shaped recess 136 and a cam curve 137 which radially ascends from the axis of the journalling bolt 121. The V-shaped recess 136 of control cam 131 straddles a guide member 138 of a latch pawl 141. The pawl 141 has a tapering extension 142 which can enter into catch recesses 143 of an arresting segment 144 fastened to the side wall 124. The extension 142 merges with a cam curve 145 bordered and limited by a latch hook 146. The hook 146 cooperates with a pin 148 (FIG. 7, right) which is fastened to the crank arm 62 and extends through an arcuate opening 147 in side wall 124.

The control member 132, carrying the pawl 141, is biased by a pull spring 149 (shown in FIG. 7 in two broken-apart parts) which is hung onto the lug 135 of control member 132 and connected with the pin 148 of crank arm 62. The control member 132 further carries a bearing pin 150 which passes through a bore 151 of a cam segment 152. The segment 152 has an arcuate opening 153 and carries a stop 154 which acts upon the edge 155 of the gear segment 133. The segment 152 further has a cam curve 156 engaged by a roller 157. The roller is journalled on a bifurcated latch lever pivotally rotatable upon a pin 159 which is fastened to the side wall 124. The latch lever 158 carries another pressure roller 160 in follower engagement with the above-mentioned cam curve 137. Fastened to the segment 152 is a pin 161 which enters into a radially extending, rectangular opening 162 of the gear segment 133.

The above-described differential mechanism commences its operation as soon as a machine run is initiated by depression of the key 31 in bank unit 20. Such release of the machine run is effected by displacement of the latching slider 26 (FIG. 3) acted upon by the cross pin 24 of the lock nut 21. During each such machine run the main control shaft (not illustrated) of the machine performs a single-turn revolution and thereafter stops. A pinion (not illustrated) on the main control shaft meshes with the gear segment 125 (FIGS. 5, 7) of the transfer mechanism and thus turns the segment 125 a given angle of rotation during each machine run. Hence, the amount of rotation of gear segment 125 is fixed for each run and not affected by the selected position of the feeler member 43 (FIG. 2). Only when the machine run is completed, is the gear segment 125 reset to the starting position. In the meantime, the differential mechanism has performed the operations described presently.

At the beginning of the machine run, the gear segment 125 acts through the dog pin 128 upon the control cam 131 and turns it counterclockwise (FIG. 7). The control member 132 is entrained in the same sense of rotation due to the fact that the pawl 141, secured to the control member 132, has its guide member 138 engaged into the V-shaped recess 136 of control cam 131. Due to the action of the pull spring 149 the crank arm 62 (FIGS. 7, 5) likewise participates in the same counterclockwise motion. As soon as the crank arm 62 is arrested in any position by the feeler member 43 (FIGS. 2, 5), the control member 132, entrained by pawl 141, tensions the pull spring 149. Then the hook 146 of pawl 141 straddles the dog pin 128 and thereby turns the pawl 141 clockwise about its pivot 139, 140 relative to the control member 132. During further rotation of member 132, the guide portion 138 of pawl 141 is moved out of the V-shaped recess of control cam 131, and the lug portion 142 of pawl 141 enters into one of the tooth recesses 143 of the arresting segment 144. This blocks the crank arm 62 and the parts 132, 141 connected therewith in the position then reached, until the gear segment 125 has completed its counterclockwise driving motion.

The above-described gear segment 133 of the differential mechanism meshes with gears (not illustrated) which transmit its rotary motion to the printing devices and indicating devices of the cash register in order to set these devices in accordance with the selection posted into the transfer mechanism by means of the key-controlled feeler member 43. The gear segment 133 for transferring the posted information into the printing and indicating devices is driven by the pin 161 of the control cam 152, which pin passes through the radial slot 162 of the segment 133. For accurately adjusting the gear segment 133 which is biased clockwise by a spring (not illustrated), the gear segment 133 is blocked in the proper position. For this purpose, the control segment 152 has the above-mentioned stop 154 and a cam contour at 156. The cam curve 156 is engaged by the follower roller 160 of the latch lever 158 which blocks the gear segment 133 under the action of the cam curve 137 so as to reliably arrest the segment 133 in the position determined by that of the crank arm 62.

As described above, the crank arm 62 is linked at 61 to rod 64 (FIG. 5) which drives through a gear segment 67 (FIG. 6) the pinion 68 on the adding-mechanism selector shaft 68a. Hence the above-described arresting and blocking of arm 62 in a position determined by the key-controlled position of the feeler 43 (FIGS. 2, 5) has also the effect of selecting the one adding mechanism 69 that is assigned to the particular key 31 (FIGS. 1, 2, 3, 4, 4a) inserted and pushed into the lock 20.

After the posted amounts are thus entered into the machine and any computing steps are completed, the gear segment 125 is returned to the starting position shortly before the termination of the machine run. During this return, the blocking of the gear segment 133 by the latch lever 158 is released and, during further return motion of the control cam 131, the guide member 138 of the pawl, biased by the pull spring 149, drops into the V-shaped recess 136 of the control cam 131. This releases the blocking of the crank arm 62, so that the arm can return to its starting position under the action of the gear segment 125.

The lock nut 86 (FIG. 2) is further connected with a cam disc 100 which acts upon the follower pin 101 of the lever 102 for controlling the release of the machine. The lever 102 is rotatably pivoted on the pin 103 and carries a dog pin 104 acting upon the zero-pawl slider 25 which, in a given position, effects release of the crank arm 62.

The lock units 7 and 8 in the mode-selector bank 4 of the keyboard (FIG. 1) are designed in the same manner as described above with reference to the lock unit 20, and the differential mechanism for bank 4 is also designed in accordance with the one described above. The removable lock keys 110, 111 (FIG. 1) mating with the respective lock units 7 and 8 release respective totalizing, subtotalizing and other calculating operations of the adding mechanisms. A single differential mechanism can be used for the entire bank 4 and is provided with a feeler member or slider corresponding to the one denoted by 43 and described above. The shank portions of the built-in push-button keys 9, 10, 11 as well as those of the removable keys 110, 111 are designed and operative in the manner described above with reference to keys 31, 56 and 57. It will be understood, of course, that the built-in keys, such as key 9, have a fixed design of the shoulders acting upon the slider or feeler member, whereas each of the lock units 7 and 8 may be given a number of mating keys with respectively different shank portions as described above with reference to key 31.

The individual lock keys 31, 56, 57, 110, 111 may also be modified with respect to the projections that control the feeler member as regards the position to be occupied thereby. For example, lateral steps or shoulders may be machined into these keys which act upon pins or the like displaceable members mounted within the barrel portion of the lock. These pins then assume the function of the shoulders 41, 54, 55 of keys 31, 56, 57 or 110, 111 illustrated in the embodiment described above.

The performance of the illustrated device when in use is as follows.

In a store where several salesmen are to operate the cash register, each of them is assigned a given key 31, 56, 57. When a customer purchases a number of goods from a salesman, for example the one having the key 31, then the salesman, when registering the transaction in the cash register, uses his key 31 for selecting the one adding mechanism 69 assigned to him and for simultaneously releasing the machine run. To do this, the salesman first posts the amount of the first item into the machine by operating the amount keys 21. He also selects the adding mechanism assigned to the particular type of goods, by depressing one of the not motorized selector keys 12, 13, 14, 15 in bank 5. Thereafter the salesman inserts his own key 31 into the lock nut 21 and depresses the key. As a result, the arresting slider 26 catches the latch pin 24 and thus locks the nut 21 as well as the key 31 in the depressed position while simultaneously releasing the amount-entering machine run. The differential mechanism is now actuated as described above. That is, the gear segment 125 turns clockwise (FIG. 5) and, by means of crank arm 62 and link 60, displaces the slider 43 of the feeler assembly. Depending upon the position in which the arm 62 is arrested in the above-described manner, the particular adding mechanism 69 corresponding to this position is selected. The travel motion of the feeler 43 and hence of the crank arm 62 is limited by the fact that the proper shoulder 42 of feeler slider 43 abuts against the stop shoulder 41 of the inserted and pushed-in key 31. Due to this selection of the particular adding mechanism assigned to the salesman operating the machine, the posted amount is added to his sales account during the continuation of the machine run. At the end of the machine run, in which the adding and totalizing mechanisms have been put into action, the amount keys 21, the depressed key in selector bank 5 and the removable lock key 31 are released.

The rest of the registering operation is conventional and will be briefly described only for the sake of completeness. As soon as all items are posted and entered into the machine, the amount to be paid by the customer is determined. The totalization is released by depression of the motorized key 9. During totalizing operation, the adding mechanism for forming the sum of the individual items (not illustrated) is discharged, the amount to be paid is printed upon a check to be issued by the machine as well as upon an accounting tape remaining in the machine; and at the termination of the totalizing machine run the key 9 is released.

It will be understood that when a different salesman operates the cash register, for example using his key 56, the shoulder 53 of the key cooperates with step 52 of the slider assembly 43, thus selecting a different adding mechanism 69 into which the amount of transaction is entered into the account of the second salesman, all operations being otherwise identical with those described above.

When after close of the business day, the adding mechanisms assigned to the respective salesmen are to be reset to zero, the manager or other authorized person inserts his master key 83 into the keyhole 88 (FIG. 2) of lock 86 and turns this key until the desired account number is shown on the indicator disc 85. Then the stop 74 (FIG. 2) corresponding to the particular adding mechanism 69 (FIG. 6) is located in the path of the forward edge 92 (FIG. 2) of the sliding feeler member 43. During the next machine run, which is released by actuating the lock key 7 (FIG. 1), the front edge 92 (FIG. 2) runs against the particular step 74 during rotation of the crank arm 62 (FIG. 5) and is thus arrested in the proper selected position. The adding mechanism 69 thus selected, is reset to zero during the further machine operation due to the fact that the key in unit 7 releases a totalizing operation; and the sum thus determined is printed upon the accounting tape of the machine.

By inserting a different key 110 into the same lock unit 7, a subtotal can be released if the manager or authorized person wants to obtain an intermediate indication of the individual totals credited to the accounts of the respective salesmen.

In the same manner, the other adding mechanisms 69 assigned to the respective other salesmen are reset to zero. Consequently, upon termination, of the above-described operation for all salesmen, the manager obtains on the accounting tape of the machine not only the total amount of the turnover effected by all salesmen but also the amounts to be credited to the individual salesmen without the need of using for this purpose the keys 31, 56, 57 assigned to the respective salesmen.

When a single cash register is to be operated by a relatively large number of salesmen, the registering operation can be additionally accelerated by providing the bank 6 (FIG. 1) with two key units 20, so that the individual salesmen have the possibility of inserting their keys into the free unit 20 before the next previous registering operation is completed.

The above-mentioned zero pawl slider 25 (FIGS. 3, 10) has a recess 105 entered into by the pin 104 of the lever 102 (FIGS. 2, 3, 10) which during rotational motion of the control disc 100 is entrained by clockwise motion of a shoulder 106 (FIG. 10) on disc 100, thus moving the lever 102 counterclockwise about the pivot pin 103. The pin 104 of lever 102 then pulls the zero pawl slider 25 to the right with reference to FIG. 10, and the entrainer 107 of slider 25 then entrains the lever arm 108 of a zero stop pawl 109.

The zero pawl slider 25 further has a sloping cam edge 112 engageable by the cross pin 24 of the lock nut 21 (FIGS. 3, 10) so that when the lock nut is being depressed, the pin 24 moves the slider 25 toward the right (FIG. 10) against the force of a return spring 113. The zero stop pawl 109 is pivotally mounted on the lateral wall 124 (FIG. 5) and biased by a spring 109' (FIG. 10) to cooperate with a releasing lever 114 (FIGS. 10, 5) for releasing the feeler assembly 43 (FIG. 5). For this purpose the feeler assembly 43 has a recess 115 into which the releasing lever 114 may catch so that when the releasing lever 114 is lifted by means of the slider 25, the feeler assembly 43 is released and can follow the movements of the crank arm 62.

As mentioned, the latching slider 26 (FIGS. 3, 11) retains the cross pin 24 of the lock nut 21 in the depressed position of the key 31. This is effected by means of a catch 116 (FIG. 11) of the latching slider 27 under the action of a pull spring 117. The latch slider is guided by fixed guide pins 118 passing through slots 119.

The above-described details of the control devices are particularly applicable to a business machine with a planar keyboard as known, for example, from computing machines of the Friden or Marchant types according to U.S. Patents 2,650,761 and 2,304,329.

According to a modification of the invention, relating to a machine with an arcuate keyboard according to FIGS. 8 and 9, the lock or key unit 20 is fastened to the arcuate keyboard assembly 12 by means of screws 13. Differing from the differential mechanism 63 described above, the arcuate-board machine is provided with a transfer (differential) mechanism 15 according to FIG. 9. Aside from matters of shape, this mechanism corresponds in design and functioning to the above-described differential mechanism 63, except that the linearly displaceable feeler member is substituted by a rotationally displaceable feeler lever 16 which is provided with control shoulders 18, 19 to operate in the same manner as described above with reference to the slider assembly 43 (FIG. 5). According to FIG. 9 the rotatable lever 16 has stop shoulders 18, 19, to cooperate with stop shoulders 41, 53 of the keys 31, 56, 59 substantially as described above.

The differential mechanism 15 or 63 (FIGS. 5, 7, 9) is driven from the main control shaft 170 whose cams 175 and 176 act upon the rollers 177, 178 of a follower lever 180 which is pivoted on a pin 179 and has a gear segment 182. At the beginning of a machine run the segment 182 turns clockwise relative to FIGS. 7, 9. Shortly before termination of the machine run, the segment 182 returns counterclockwise to the starting position. The gears segment 182 meshes with the above-described gear segment 125 (FIG. 7).

The gear segment 133 (FIGS. 7, 9) meshes with a spur gear 185 (FIG. 9) which is connected through a hollow shaft 186 with a type wheel of the printing mechanism (not illustrated). The gear segment 133 further cooperates with a gear segment 187 journalled on the machine frame structure which, acting through a double segment 188, 189 adjusts the driving spur gear 190 of an indicator drum 191 in the indicating portion 2c (FIG. 8) of the machine.

Relative to performance, the machines with a planar keyboard and those with an arcuate keyboard differ substantially only in that in the planar-board machine the crank arm 62, acting through the link 60, directly adjusts the sliding feeler assembly 43, whereas in the machine with arcuate keyboard the arm 116 of the differential mechanism directly cooperates with the stop shoulders 41, 53 of the keys 31, 56.

It will be obvious to those skilled in the art, upon a study of this disclosure, that my invention permits of a great variety of modifications, particularly with respect to design details and arrangement of the individual components of the novel device, and hence that the invention can be given embodiments other than particularly illustrated and described herein, without departing from the essential features of my invention and within the scope of the claims annexed hereto.

I claim:

1. Selective control device for cash registers, computers, accounting machines and other business machines, comprising a keyboard assembly having selective key means for posting a selection of adding mechanisms and operating modes, said key means comprising a safety lock having a fixed outer portion and an inner keyhole portion axially slidable in said outer portion and a spring biasing said keyhole portion to a top limit position, said keyhole portion being normally locked in said limit position relative to said outer portion, a plurality of lock keys mating said keyhole portion and removable therefrom, said keyhole portion being unlockable and displaceable only when inserting and pushing one of said respective keys, said keys having respectively different shank portions protruding inwardly beyond said keyhole portion when said respective keys are inserted and pushed in, a differential mechanism mounted beneath said keyboard assembly for entering the posted selection, said differential mechanism having a displaceable feeler member and drive means coupled with said feeler member for displacing it, spring means connecting said feeler member with said drive member to permit stopping said feeler member and stressing said spring means during continuing operation of said drive means, said feeler member having a path of displacement transverse to the path of pushing motion of the inserted key and being engageable with said protruding shank portion of the inserted key when the latter is pushed in, whereby said feeler member during operation of said drive is stopped by said shank portion in a selected position of displacement corresponding to the particular one of said different keys used at a time.

2. In a business-machine control device according to claim 1, said different lock keys, all mating said keyhole portion, having respectively different lengths of said protruding shank portions, and said feeler member having a stepped contour engageable at one of its respective steps with the inserted and pushed-in key depending upon the length of the producing shank portion of said key.

3. In a business-machine control device according to claim 1, said feeler member comprising two parallel sliders rigidly joined with each other, each of said two sliders having a stepped contour, and said protruding portions of each of said different lock keys having two shoulders engageable with the steps of said respective slider.

4. In a business-machine control device according to claim 3, the two shoulders of each of said keys being different from the shoulders of the other keys with respect to the location of at least one of said two shoulders relative to the axial length of said key.

5. A business-machine control device according to claim 1, comprising a master selector member adjustable independently of said lock to a number of respective positions and engageable by said feeler member in respectively different positions of feeler displacement depending upon the selected adjustment of said master selector member.

6. In a business-machine control device according to claim 5, said master selector member being rotatably adjustable and having a stepped contour with each step having a radial spacing from the rotation axis different from the radial spacing of the peripherally adjacent steps, each of said steps being positionable into said feeler displacement path to stop said feeler member.

7. A business-machine control device according to claim 6, comprising another safety lock having a normally locked keyhole portion rotatable upon insertion of a mating key, gear means connecting said lock portion with said selector member for rotationally adjusting the latter.

8. A business-machine control device according to claim 7, comprising control means for resetting said differential mechanism to zero, said control means being linked to said other lock to be actuated by rotation of said latter lock portion.

References Cited in the file of this patent

UNITED STATES PATENTS

| | | |
|---|---|---|
| 1,471,689 | Russell-Clarke | Oct. 23, 1923 |
| 1,761,571 | Kropff | June 3, 1930 |
| 2,110,854 | Fuller et al. | Mar. 15, 1938 |
| 2,265,125 | Beria | Dec. 9, 1941 |
| 2,476,853 | Fowler et al. | July 19, 1949 |